US012112656B2

(12) United States Patent
Fukushima

(10) Patent No.: US 12,112,656 B2
(45) Date of Patent: Oct. 8, 2024

(54) FLOATING ADVERTISEMENT DEVICE

(71) Applicant: TOKO Life Creates Co., Ltd., Tokyo (JP)

(72) Inventor: Shinji Fukushima, Tokyo (JP)

(73) Assignee: TOKO Life Creates Co., Ltd., Tokyo (JP)

( * ) Notice: Subject to any disclaimer, the term of this patent is extended or adjusted under 35 U.S.C. 154(b) by 116 days.

(21) Appl. No.: 17/959,080

(22) Filed: Oct. 3, 2022

(65) Prior Publication Data

US 2023/0154364 A1     May 18, 2023

(30) Foreign Application Priority Data

Nov. 15, 2021  (JP) ................................ 2021-185332

(51) Int. Cl.
| | |
|---|---|
| *G09F 21/14* | (2006.01) |
| *B64C 39/02* | (2023.01) |
| *B64U 101/00* | (2023.01) |
| *G09F 13/04* | (2006.01) |
| *H04W 4/40* | (2018.01) |

(52) U.S. Cl.
CPC ............ *G09F 21/14* (2013.01); *B64C 39/024* (2013.01); *G09F 13/0468* (2021.05); *H04W 4/40* (2018.02); *B64U 2101/00* (2023.01)

(58) Field of Classification Search
CPC ...... G09F 21/14; G09F 13/0468; G09F 21/12; H04W 4/40; B64C 39/024; B64U 2101/00
See application file for complete search history.

(56) References Cited

U.S. PATENT DOCUMENTS

| | | | | |
|---|---|---|---|---|
| 3,670,440 A | * | 6/1972 | Yost ........................ | G09F 21/12 40/538 |
| 3,683,530 A | * | 8/1972 | Robinson ................ | G09F 21/12 40/215 |
| 9,957,045 B1 | * | 5/2018 | Daly .................... | G05D 1/0027 |
| 10,577,126 B2 | * | 3/2020 | Mozer .................... | B64U 80/25 |

(Continued)

FOREIGN PATENT DOCUMENTS

| | | |
|---|---|---|
| JP | 2000-105562 A | 4/2000 |
| JP | 3088954 U | 10/2002 |

(Continued)

*Primary Examiner* — David R Dunn
*Assistant Examiner* — Christopher E Veraa
(74) *Attorney, Agent, or Firm* — Kratz, Quintos & Hanson, LLP

(57) ABSTRACT

A floating advertisement device includes: an electric unmanned flying object connected to one end of a power supply line that supplies power; a control unit controlling an operation of the electric unmanned flying object; an advertisement medium hung from the electric unmanned flying object, and having, at a lower end surface thereof, a landing guide part that performs positioning at a time of descending; an advertisement display unit capable of displaying advertisement contents in a changeable manner as an outer peripheral surface of the advertisement medium, and formed in a bendable manner; a power source disposed on the ground and connected to the other end of the power supply line; and a support member capable of supporting the advertisement medium by being fitted with the landing guide part when the advertisement medium descends.

15 Claims, 4 Drawing Sheets

(56) References Cited

U.S. PATENT DOCUMENTS

| | | | | |
|---|---|---|---|---|
| 11,111,016 B1* | 9/2021 | Pachikov | | B64F 1/12 |
| 11,168,487 B2* | 11/2021 | Wankewycz | | E04H 6/44 |
| 11,634,219 B2* | 4/2023 | Rowse | | G05D 1/104 |
| | | | | 244/2 |
| 2004/0167682 A1* | 8/2004 | Beck | | B64U 10/60 |
| | | | | 701/2 |
| 2015/0069968 A1* | 3/2015 | Pounds | | B60L 53/35 |
| | | | | 320/109 |
| 2016/0001883 A1* | 1/2016 | Sanz | | H02J 7/0044 |
| | | | | 244/17.23 |
| 2016/0011592 A1* | 1/2016 | Zhang | | B64C 39/024 |
| | | | | 244/114 R |
| 2016/0311329 A1* | 10/2016 | Rodriguez | | H02J 7/00 |
| 2016/0340006 A1* | 11/2016 | Tang | | G16H 40/67 |
| 2017/0240279 A1* | 8/2017 | Molnar | | G03B 21/608 |
| 2017/0276833 A1* | 9/2017 | Narabu | | G05D 1/106 |
| 2018/0047319 A1* | 2/2018 | Barba | | G03B 21/10 |
| 2018/0141682 A1* | 5/2018 | Blake | | B64U 70/97 |
| 2018/0342184 A1* | 11/2018 | Magovern, III | | G09F 21/12 |
| 2020/0027242 A1* | 1/2020 | Koyama | | H04N 17/002 |
| 2020/0410540 A1* | 12/2020 | Williams | | G09F 9/30 |
| 2021/0341128 A1* | 11/2021 | Abron | | F21S 41/153 |

FOREIGN PATENT DOCUMENTS

| | | |
|---|---|---|
| JP | 3122449 U | 6/2006 |
| JP | 2016-179742 A | 10/2016 |
| JP | WO2014/203593 A1 | 2/2017 |
| JP | WO2017/094842 A1 | 9/2018 |
| JP | 2019-34713 A | 3/2019 |
| JP | 2020-027181 A | 2/2020 |
| JP | 2020-201393 A | 12/2020 |
| WO | 2014/203593 A1 | 12/2014 |
| WO | 2017/094842 A1 | 6/2017 |
| WO | 2022/118365 A1 | 6/2022 |

* cited by examiner

FLOATING ADVERTISEMENT DEVICE

BACKGROUND OF THE INVENTION

1. Field of the Invention

The present invention relates to a floating advertisement device capable of displaying different advertisements according to places and time, indoors or outdoors for a long time in a stable manner at low costs, while capable of easily performing collection thereof, and is particularly suitable for a floating advertisement device that uses a drone capable of flying autonomously.

2. Description of the Related Art

Various advertisement media have been conventionally existed other than newspapers, magazines, radios, televisions, and so on, and an ad balloon (with a size of a diameter of about 2.0 to 2.3 meters) in which gas such as a helium gas lighter than air is filled in a spherical balloon, for example, also exists as one kind of outdoor advertisement media. However, the helium gas is losing its superiority in terms of cost because of an influence of steep rise in prices according to a short supply. There exists a hydrogen gas as another gas lighter than air, but since the hydrogen gas is combustible, it has not been used generally for ad balloons in recent years.

On the other hand, ad balloons as outdoor advertisement media are easily affected by wind, and thus there have been disadvantages that they are difficult to be operated when inclined at an angle of approximately 45 degrees or more.

On the contrary, as prior art documents regarding ad balloons, the following Patent Documents 1 and 2 are known. The Patent Document 1 discloses a technique in which a lightweight speaker device for high places is used by being hung from an ad balloon. Further, Patent Document 2 discloses a technique regarding an ad balloon having an ad balloon main body including movable parts such as a head part, a torso part, a hand part, or a foot part, and a driving device for moving the movable parts mounted on the ad balloon main body.

On the other hand, the following Patent Document 3 is known as a prior art document in which an advertisement medium connected to an electric unmanned flying object such as a drone to which power is supplied from the ground, is used. Specifically, this Patent Document 3 discloses a technique in which advertisement can be performed for a long time in a stable manner with a drone and the like, without using a helium gas.

Meanwhile, in accordance with usage of a communication line such as an Internet line, advertisements utilizing data have also become to be known in recent years. The advertisement is, for example, one in which when an advertiser or an advertisement agency inputs advertisements by images or document texts in a distribution system, the advertisements are displayed on a large-sized display installed in a commercial establishment or outside a building connected via a communication line, or the advertisements are displayed on a display installed in a station yard or inside an electric railcar. However, advertisements often set targeted age group and gender group, and thus it is also known that advertisements are often displayed by selecting previously-examined time zones and places, without displaying similar advertisements in every place.

Patent Document 1: Utility Model Registration Publication No. 3122449

Patent Document 2: Utility Model Registration Publication No. 3088954

Patent Document 3: Japanese Patent Application Laid-open No. 2020-201393

However, even in the inventions of Patent Documents 1 and 2, since conventionally-used ad balloons are used, they are easily affected by wind outdoors, and there have been disadvantages that the superiority in terms of cost is being lost because also of the influence of steep rise in prices of helium gas. Further, the invention like in Patent Document 3 in which the drone is used and the advertisement medium is hung from the drone and the like, has been considered in recent years, but in the inventions so far, it has been difficult to display different advertisements according to places and time, and besides, it has been difficult to successfully collect the advertisement medium at the termination of advertisement.

SUMMARY OF THE INVENTION

In response to this, necessity for an advertisement medium capable of not only performing advertisement outdoors for a long time in a stable manner at low costs, but also displaying different advertisements according to places and time, has been increasing.

The present invention was made in view of the above-described background, and its object is to provide a floating advertisement device capable of displaying different advertisements according to places and time, outdoors for a long time in a stable manner at low costs, while capable of easily performing collection thereof.

A first invention of a floating advertisement device includes: an electric unmanned flying object connected to one end of a power supply line that supplies power; a control unit controlling an operation of the electric unmanned flying object; an advertisement medium hung from the electric unmanned flying object, and having, at a lower end surface thereof a landing guide part that performs positioning at a time of descending; an advertisement display unit capable of displaying advertisement contents in a changeable manner as an outer peripheral surface of the advertisement medium, and formed in a bendable manner; a power source disposed on the ground and connected to the other end of the power supply line; and a support member capable of supporting the advertisement medium by being fitted with the landing guide part when the advertisement medium descends.

Functions of the first invention of the floating advertisement device will be explained below.

According to the present invention of the floating advertisement device, the advertisement medium having the advertisement display unit capable of displaying the advertisement contents in the changeable manner, formed in the bendable manner on the outer peripheral surface, is hung from the electric unmanned flying object whose flying operation is controlled by the control unit. Further, the one end of the power supply line is connected to the electric unmanned flying object, the other end of the power supply line is connected to the power source disposed on the ground, and the power source supplies power to the electric unmanned flying object via the power supply line.

For this reason, in accordance with a takeoff of the electric unmanned flying object through control of its operation by the control unit, the advertisement medium ascends by being hung from the electric unmanned flying object, even if there exists no gas such as a helium gas therein, and besides, the bent advertisement display unit is spread, resulting in that the advertisement medium can propagate information to the outside. Further, since the electric unmanned flying object is connected to the power supply line that supplies power from the power source disposed on the ground, it becomes possible to realize a flight of the electric unmanned flying object without being limited by power consumption. Furthermore, the advertisement contents which are displayed by the advertisement display unit forming the outer peripheral surface of the advertisement medium can be displayed in the changeable manner, which also makes it possible to display different advertisements according to places and time.

On one hand, the landing guide part that performs positioning when the advertisement medium descends, is provided to the lower end surface of the advertisement medium, the support member is provided on the ground side, and when the advertisement medium descends, the landing guide part and the support member are fitted with each other, resulting in that the support member can support the advertisement medium. When the advertisement medium is stored by being supported by the support member, since the advertisement display unit being the outer peripheral surface of the advertisement medium is formed in the bendable manner, the advertisement display unit can land in a compact state by being bent and folded, resulting in that the advertisement medium can be easily collected.

On the other hand, the operation of the electric unmanned flying object is controlled by the control unit, so that even when wind blows, the flight control can be performed to make the electric unmanned flying object stay at a certain position.

According to the above, since the floating advertisement device of the present invention uses, instead of the helium gas, the electric unmanned flying object to which the power can be supplied from the ground, the flight can be performed for a long time at low costs, and further, since the electric unmanned flying object flies while being controlled, it is difficult to be affected by wind, resulting in that the advertisement can be performed by the advertisement medium for a long time in a stable manner. In addition to this, it becomes possible to display different advertisements according to places and time.

A second invention of a floating advertisement device includes: an electric unmanned flying object connected to one end of a power supply line that supplies power; a control unit controlling an operation of the electric unmanned flying object; an advertisement medium hung from the electric unmanned flying object, having, at a lower end surface thereof, a landing guide part that performs positioning at a time of descending, and formed to have a truncated quadrangular pyramid shape in which a lower surface side is narrowed; an advertisement display unit arranged on each trapezoidal surface being an outer peripheral surface of the advertisement medium having the truncated quadrangular pyramid shape, capable of displaying advertisement contents in a changeable manner, and formed in a bendable manner; a power source disposed on the ground and connected to the other end of the power supply line; and a support member capable of supporting the advertisement medium by being fitted with the landing guide part when the advertisement medium descends.

The second invention of the floating advertisement device is the device in which the advertisement medium is formed to have the truncated quadrangular pyramid shape in which the lower surface side is narrowed, and the advertisement display unit is provided to each trapezoidal surface of the truncated quadrangular pyramid shape. The advertisement medium has the truncated quadrangular pyramid shape in which the lower surface side is narrowed as described above, so that even when the advertisement medium ascends high, visibility of the advertisement display unit never deteriorates.

A third invention of a floating advertisement device includes: an electric unmanned flying object connected to one end of a power supply line that supplies power; a control unit controlling an operation of the electric unmanned flying object; an advertisement medium hung from the electric unmanned flying object, and having, at a lower end surface thereof, a landing guide part that performs positioning at a time of descending; an advertisement display unit being a thin and bendable organic EL display capable of displaying advertisement contents in a changeable manner as an outer peripheral surface of the advertisement medium, and to which power is supplied by being connected to the power supply line; a power source disposed on the ground and connected to the other end of the power supply line; and a support member capable of supporting the advertisement medium by being fitted with the landing guide part when the advertisement medium descends.

The third invention of the floating advertisement device is the device in which the advertisement display unit is formed as the thin and bendable organic EL display, and the power supply line can supply power also to the organic EL display. As above, the advertisement display unit is made by the thin and bendable organic EL display, and in accordance with this, the power is made to be supplied to the organic EL display through the power supply line, resulting in that stable advertisements with high visuality can be supplied for a long time in a stable manner, and it becomes possible to concretely realize that the advertisement medium is folded to be in a compact state when it lands.

Further, in each of the inventions described above, it can be considered that the advertisement medium is formed in a truncated quadrangular pyramid shape in which a lower surface side is narrowed, and the advertisement display unit is provided to each trapezoidal surface of the truncated quadrangular pyramid shape. Since the advertisement medium is formed in the truncated quadrangular pyramid shape in which the lower surface side is narrowed as described above, even when the advertisement medium ascends high, the visibility of the advertisement display unit never deteriorates.

On the other hand, it can be considered that the landing guide part of the advertisement medium is formed in a tapered projecting shape in which a lower side is narrowed and the support member is formed in a tapered recessed shape in which a lower side is narrowed, the electric unmanned flying object is a drone, and a receiver capable of receiving, by radio, video signals or a broadcast from the outside is provided inside the advertisement medium and the receiver is connected to the advertisement display unit.

The floating advertisement device according to the present invention brings about excellent effects that it is possible to display different advertisements according to places and time, outdoors fir a long time in a stable manner at low costs, while capable of easily performing collection thereof.

DETAILED DESCRIPTION OF THE PREFERRED EMBODIMENTS

Figure 1:
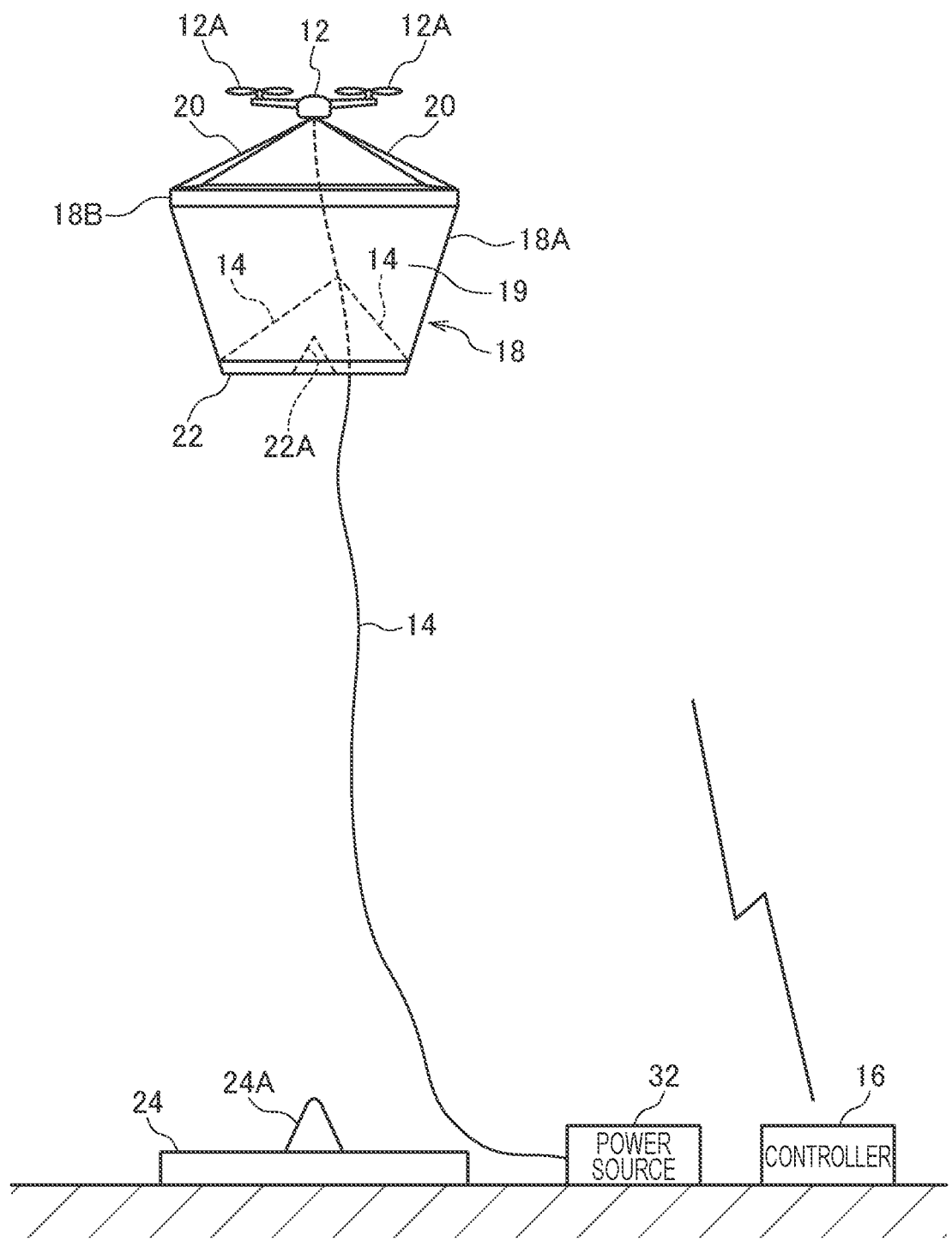
FIG. 1 is a schematic view of a floating advertisement device according to an embodiment of the present invention.

A first embodiment of a floating advertisement device according to the present invention will be hereinafter described in detail while referring to the drawings.

Figure 2:
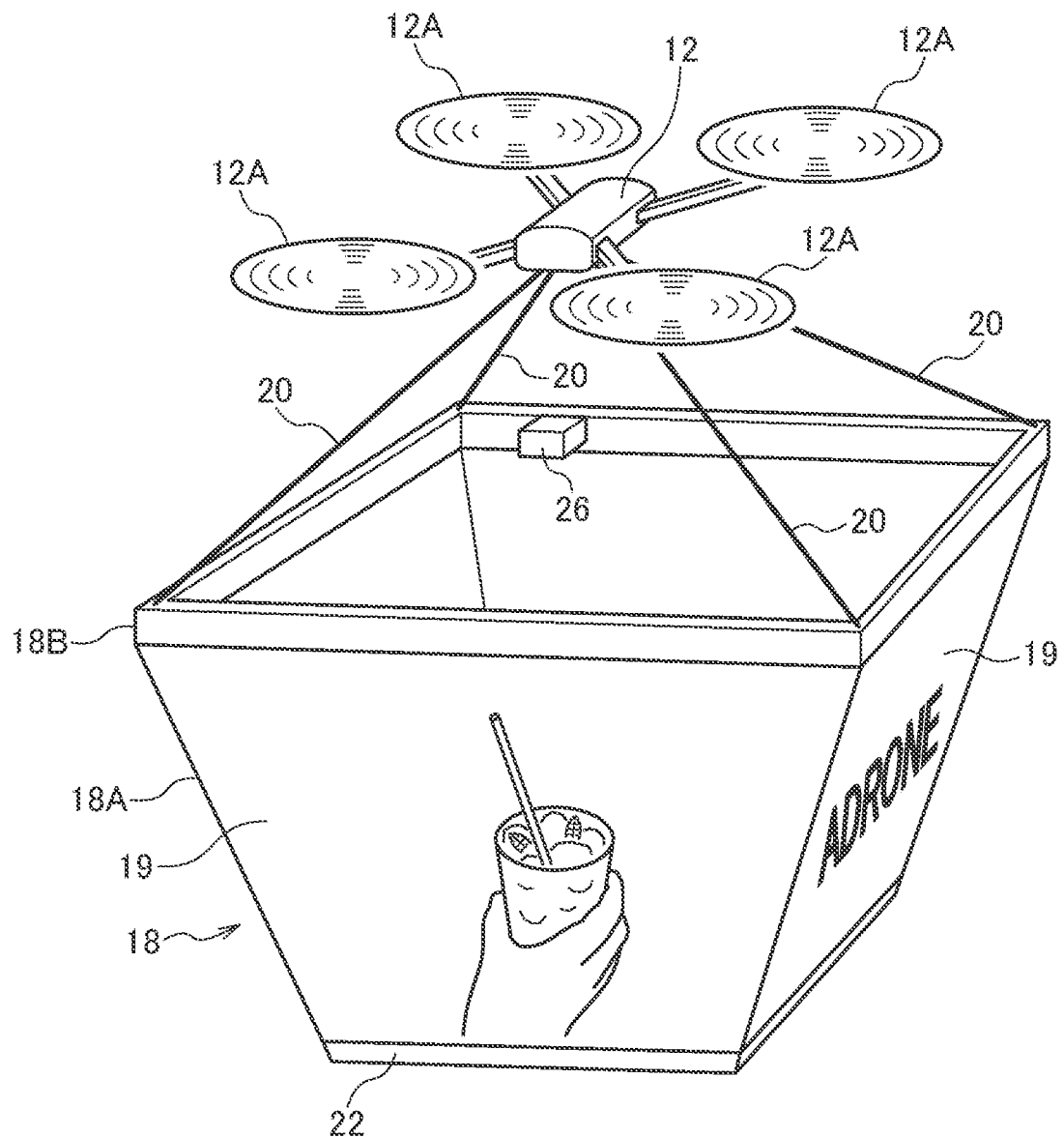
FIG. 2 is a perspective view illustrating an advertisement medium in a state where advertisements of the floating advertisement device according to the embodiment of the present invention are displayed (note that a power supply line is omitted).

As illustrated in FIG. 1 and FIG. 2, in the floating advertisement device of the present embodiment, a drone 12 having, for example, not-illustrated four motors which rotate four propellers 12A, respectively, and whose flight is controlled by a controller 16, is positioned at an uppermost part, and to a lower end side of the drone 12, one end of a power supply line 14 for supplying power is connected.

On a lower side of the drone 12 being an electric unmanned flying object, an advertisement medium 18 for propagating advertisement information to the outside is positioned by being hung from the drone 12. A main body part 18A of the advertisement medium 18 is formed in a truncated quadrangular pyramid shape in which a lower surface side is narrowed, and each trapezoidal surface of the truncated quadrangular pyramid shape is provided with an advertisement display unit 19. Specifically, since the advertisement medium 18 has the advertisement display units 19 of four surfaces, the advertisement display units 19 can display advertisements as an outer peripheral surface of the advertisement medium 18. Further, each advertisement display unit 19 is made by an organic EL display which is thin and formed in a bendable manner, and the power supply line 14 is connected to be able to supply power also to these organic EL displays.

Further, as illustrated in FIG. 2, a coupling member 18B formed of a lightweight material such as an aluminum alloy or carbon in a quadrangular ring shape is provided at an upper part of the main body part 18A, and when the coupling member 18B at the upper part is coupled to the drone 12 by four wires 20, the advertisement medium 18 is bung from the drone 12.

A receiver 26 capable of receiving, by radio, video signals or a broadcast from the outside for displaying advertisements, is provided inside the advertisement medium 18, as illustrated in FIG. 2, and although not illustrated, the receiver 26 is connected to each of the organic EL displays configuring each of the advertisement display units 19. This makes it possible for each of the advertisement display units 19 to display advertisement contents or broadcast contents received from the controller 16 illustrated in FIG. 1, by video or the like, while capable of changing the advertisement contents.

On one hand, the advertisement medium 18 has, at a lower end surface thereof, a landing guide part 22 for performing positioning of the advertisement medium 18 when it descends, and formed of a metal material such as an aluminum alloy, and a center portion of the landing guide part 22 is made to be a recessed portion 22A formed in a tapered recessed shape in which an upper side is narrowed. In correspondence with this, a support member 24 formed of a metal material such as iron and capable of supporting the advertisement medium 18 by being fitted with the landing guide part 22 when the advertisement medium 18 descends, is disposed on the ground, and a center portion of the support member 24 is made to be a projecting portion 24A formed in a tapered projecting shape in which an upper side is narrowed.

Figure 3:
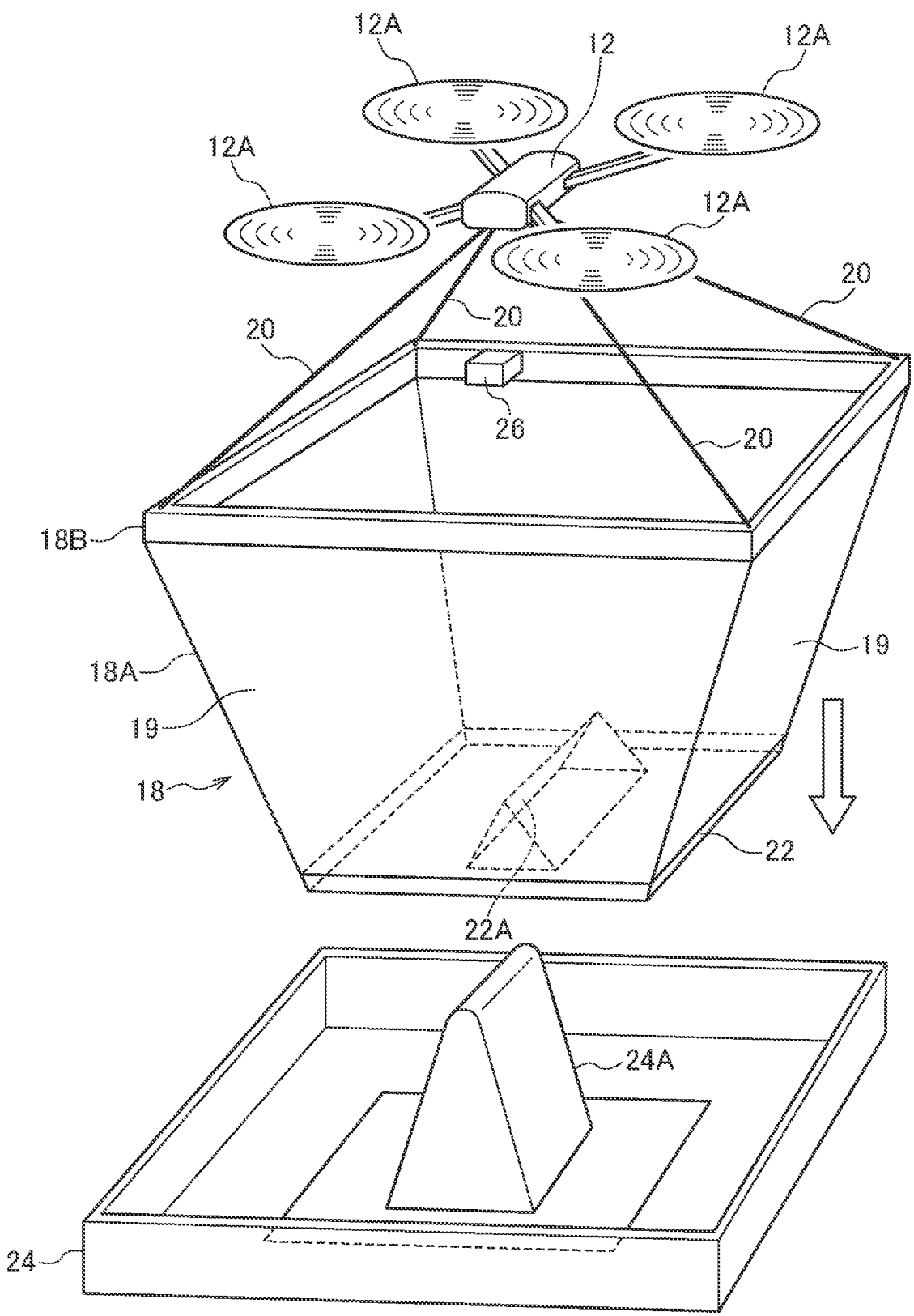
FIG. 3 is a perspective view illustrating a descending state of the advertisement medium in the floating advertisement device according to the embodiment of the present invention (note that the power supply line is omitted).

Concretely, as illustrated in FIG. 3, although these recessed portion 22A and projecting portion 24A are made to have a recessed shape and a projecting shape, respectively, linearly formed to have substantially the same length, they have edge lines such that a tip side becomes narrow and a root side becomes wide, and have sizes so that the recessed portion 22A and the projecting portion 24A are fitted with each other.

On the other hand, as illustrated in FIG. 1, the power supply line 14 connected to the drone 12 passes through the inside the advertisement medium 18 to extend downward to the ground, and the other end of the power supply line 14 is connected to a power source 32 disposed on the ground. For this reason, it is possible to constantly supply power to the drone 12 and each of the advertisement display units 19 from the power source 32 via the power supply line 14.

Next, an operation when activating the floating advertisement device of the present embodiment will be described.

Figure 4:
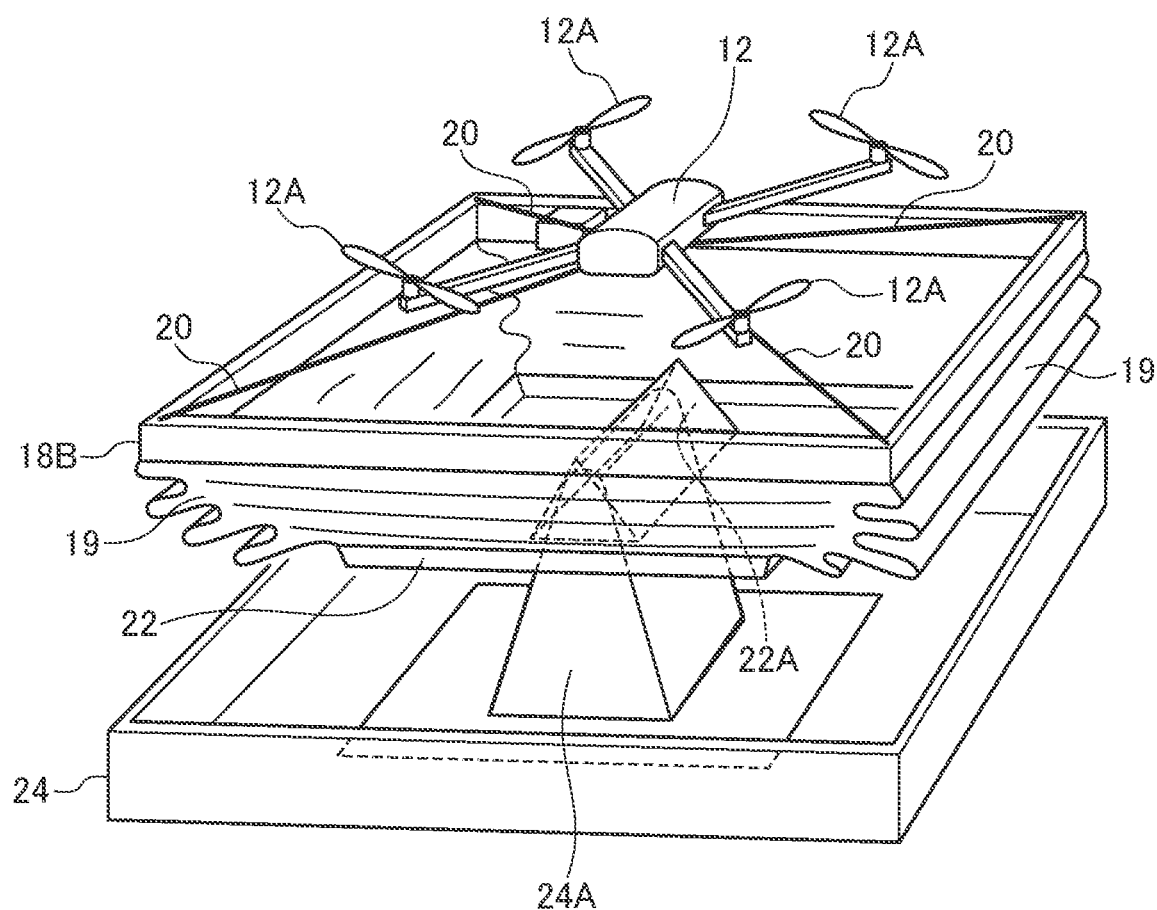
FIG. 4 is a perspective view illustrating a state where the advertisement medium of the floating advertisement device according to the embodiment of the present invention is landed while being supported by a support member (note that the power supply line is omitted).

As illustrated in FIG. 4, not only the drone 12 but also the advertisement medium 18 is positioned on the support member 24 on the ground, and when the drone 12 is activated to rotate the motors by operating the controller 16 being a control unit which controls the drone 12 by radio or wire, it is possible to make the drone 12 take off to ascend. In accordance with this, the advertisement medium 18 hung from the drone 12 also ascends, and since the advertisement display units 19 are formed in a bendable bellows shape or of a flexible material, the advertisement medium 18 including the advertisement display units 19 spreads along a longitudinal direction from the bent state, to be in a state illustrated in FIG. 1.

At this time, by previously setting, with the use of the controller 16, a latitudinal and longitudinal point on GPS, for example, in accordance with a position of the support member 24 disposed on the ground, it becomes possible to perform control so that the drone 12 stays still to be held constantly up in the sky at the previously-determined certain position. Subsequently, in such a state, power of the advertisement display units 19 is turned on, to thereby start the display of advertisement information.

Next, functions of the floating advertisement device according to the present embodiment will be described hereinbelow.

According to the floating advertisement device of the present embodiment, the advertisement medium 18 having the truncated quadrangular pyramid shape in which the lower surface side is narrowed, is hung from the drone 12 whose flight operation is controlled by the controller 16, and the lower end surface of the advertisement medium 18 is made to be the landing guide part 22 for performing positioning when the advertisement medium 18 descends. On the respective trapezoidal surfaces being the outer peripheral surface of the advertisement medium 18 having the truncated quadrangular pyramid shape, the advertisement display units 19 each being the thin and bendable organic EL display capable of displaying advertisements are arranged.

As advertisement contents on the organic EL displays, a front advertisement display unit 19 displays iced coffee poured in a cup, or the like, and a right-side advertisement display unit 19 displays characters of "ADRONE", as illustrated in FIG. 2, for example. Note that also on the advertisement display units 19 at two surfaces on a rear surface side, the same or different displays are performed as a matter of course.

Further, since the advertisement medium 18 has the truncated quadrangular pyramid shape in which the lower surface side is narrowed as described above, even when the advertisement medium 18 ascends high, visibility of the organic EL displays never deteriorates. Furthermore, in accordance with the takeoff of the drone 12, from the support member 24 previously disposed on the ground, through the control of the operation by the controller 16, the upper side of the advertisement medium 18 is pulled up, resulting in that the respective advertisement display units 19 finned to have the bendable bellows structure of the advertisement medium 18 naturally spread in the longitudinal direction. Specifically, the advertisement medium 18 is hung from the drone 12 and the respective advertisement display units 19 ascend while being turned into flat surfaces even if there exists no gas such as a helium gas therein, which makes it possible fir the advertisement medium 18 to propagate advertisement information to the outside.

Further, since the other end of the power supply line 14 whose one end is connected to the drone 12, is connected to the power source 32 disposed on the ground, the power from the power source 32 is supplied to the drone 12, and thus the drone 12 can fly for a long time without being limited by power consumption. At this time, by controlling, with the use of the controller 16, the drone 12 to be constantly held at the previously-determined position in the space, even when wind blows, the drone 12 can fly so as to stay at a certain position against the wind force, and can autonomously maintain the position. In accordance with this, the advertisement medium 18 can stably perform advertisement without being needlessly moved or inclined.

Besides, in accordance with the connection of the power supply line 14 also to the organic EL displays being the advertisement display units 19, the power source 32 supplies power also to the organic EL displays via the power supply line 14, resulting in that the power is supplied to the organic EL displays and stable advertisements with high visibility can be supplied for a long time in a stable manner.

Meanwhile, when the advertisement is terminated and the advertisement medium 18 is descended, the power of the advertisement display units 19 is cut to terminate the advertisement display, and as the advertisement medium 18 is gradually descended by reducing, while controlling, the number of rotations of the motors of the drone 12, the advertisement medium 18 is further descended in a state of being led onto the support member 24, as illustrated in FIG. 3.

At a time of this descending, the landing guide part 22 for performing positioning when the advertisement medium 18 descends is provided to the lower end surface of the advertisement medium 18, and the recessed portion 22A made to have the tapered recessed shape in which the upper side is narrowed is formed at the center portion of the landing guide part 22. Further, the support member 24 is disposed on the ground, and the projecting portion 24A made to have the tapered projecting shape in which the upper side is narrowed is formed at the center portion of the support member 24.

Since the landing guide part 22 and the support member 24 are formed as above, when the advertisement medium 18 descends, the landing guide part 22 and the support member 24 are fitted with each other, which makes it easy to perform positioning at a predetermined position, and in accordance with this, the support member 24 can securely support the advertisement medium 18. Further, since the advertisement display units 19 being the outer peripheral surface of the advertisement medium 18 are formed in the bendable manner, when the support member 24 supports the advertisement medium 18, the advertisement display units 19 can land in a compact state by being bent and folded as illustrated in FIG. 4, resulting in that the advertisement medium 18 can be easily collected.

According to the above, since the floating advertisement device of the present embodiment uses, instead of the helium gas, the drone 12 to which the power from the power source 32 on the ground can be supplied, the flight can be performed for a long time at low costs, and further, since the drone 12 flies while being controlled by the controller 16, it is unlikely to be affected by wind, resulting in that the advertisement can be performed by the advertisement medium 18 for a long time in a stable manner. In addition to this, it also becomes possible to display different advertisements according to places and time by the advertisement display units 19.

Note that in the above-described embodiment, the receiver 26 is employed for reception from the controller 16, but it is also possible to design such that the receiver 26 receives advertisement contents transmitted by wire or radio from a transmitter being a terminal of a communication line such as an external Internet line. Further, it is also possible to employ, instead of the receiver 26, a computer or the like which mounts a battery, a memory, and the like with required capacities, and previously stores advertisement contents.

Further, in the above-described embodiment, the main body part 18A of the advertisement medium 18 is formed in the shape of truncated quadrangular pyramid being a truncated square pyramid, but not limited to the truncated square pyramid, and a truncated triangular pyramid shape or a truncated pentagonal pyramid shape other than the truncated quadrangular pyramid, and a shape with two surfaces or a hemispherical shape may also be employed. Further, as the advertisement display unit 19, not only the organic EL display but also a well-known display may also be employed.

Note that as the organic EL display, it is possible to employ a thin and light flexible organic EL display which has been developed in recent years by NHK Science & Technology Research Laboratories of Japan Broadcasting Corporation. This flexible organic EL display is a 30-inch and 4K display, but has a thickness of 0.5 mm and a weight of 100 grams, and can be stored in a bent or rolled state.

On one hand, in the above-described embodiment, the recessed portion 22A formed in the tapered recessed shape is provided to the landing guide part 22, and the projecting portion 24A formed in the tapered projecting shape is provided to the support member 24, but the recessed portion and the projection portion may also be arranged oppositely. Aside form this, when one end of a rope is attached to the advertisement medium 18, and an anchor is disposed on the ground and the other end of the rope is attached to this anchor, even in a case where control failure of the drone 12 occurs, the advertisement medium 18 can be collected with no problems. Besides, if the drone 12 and the advertisement medium 18 are structured in a detachable manner by removal of the wires 20 from the drone 12, and the like, when the floating advertisement device is not operated, convenience in carriage of the advertisement medium 18 having the bendable bellows structure and folded is increased, and it becomes easy to protect a frame of the advertisement medium 18.

On the other hand, the power source 32 itself may also be a large-sized battery, and it may also be one that receives supply of power from an external electric wire, or generates power by driving a power generator using an engine or the like. Further, in the above-described embodiment, the controller is used as the control unit, but a computer or the like may also be used as the control unit, and as a control method, one in which a program and data are previously input may be employed, and one in which the drone 12 is directly operated by radio or wire may also be employed.

In the foregoing, the embodiments according to the present invention have been described, but the present invention is not limited to the above-described embodiments, and can be carried out while being modified in various ways within a range that does not depart from the spirit of the present invention.

The present invention can be used not only as an advertisement medium as an ad balloon indoors or outdoors but also as a substitute for a landmark at night by light emission of organic EL displays, and in addition to that, it can also be applied to various industrial fields.

What is claimed is:

1. A floating advertisement device, comprising:
   an electric unmanned flying object connected to one end of a power supply line that supplies power;
   a control unit controlling an operation of the electric unmanned flying object;
   an advertisement medium hung from the electric unmanned flying object, and having, at a lower end surface thereof, a landing guide part that performs positioning at a time of descending, the advertisement medium further having a lower surface side that is narrowed;
   an advertisement display unit capable of displaying advertisement contents in a changeable manner as an outer peripheral surface of the advertisement medium, and formed in a bendable manner;
   a power source disposed on the ground and connected to the other end of the power supply line; and
   a support member capable of supporting the advertisement medium by being fitted with the landing guide part when the advertisement medium descends.

2. The floating advertisement device according to claim 1, wherein
   the landing guide part of the advertisement medium is formed in a tapered recessed shape in which an upper side is narrowed, and the support member is formed in a tapered projecting shape in which an upper side is narrowed.

3. The floating advertisement device according to claim 1, wherein
   the landing guide part of the advertisement medium is formed in a tapered projecting shape in which a lower side is narrowed, and the support member is formed in a tapered recessed shape in which a lower side is narrowed.

4. The floating advertisement device according to claim 1, wherein
   the electric unmanned flying object is a drone.

5. The floating advertisement device according to claim 1, wherein
   a receiver capable of receiving, by radio, video signals or a broadcast from the outside is provided inside the advertisement medium, and the receiver is connected to the advertisement display unit.

6. A floating advertisement device, comprising:
   an electric unmanned flying object connected to one end of a power supply line that supplies power;
   a control unit controlling an operation of the electric unmanned flying object;
   an advertisement medium hung from the electric unmanned flying object, having, at a lower end surface thereof, a landing guide part that performs positioning at a time of descending, and formed to have a truncated quadrangular pyramid shape in which a lower surface side is narrowed;
   an advertisement display unit arranged on each trapezoidal surface being an outer peripheral surface of the advertisement medium having the truncated quadrangular pyramid shape, capable of displaying advertisement contents in a changeable manner, and formed in a bendable manner;
   a power source disposed on the ground and connected to the other end of the power supply line; and
   a support member capable of supporting the advertisement medium by being fitted with the landing guide part when the advertisement medium descends.

7. The floating advertisement device according to claim 6, wherein
   the landing guide part of the advertisement medium is formed in a tapered recessed shape in which an upper side is narrowed, and the support member is formed in a tapered projecting shape in which an upper side is narrowed.

8. The floating advertisement device according to claim 6, wherein
   the landing guide part of the advertisement medium is formed in a tapered projecting shape in which a lower side is narrowed, and the support member is formed in a tapered recessed shape in which a lower side is narrowed.

9. The floating advertisement device according to claim 6, wherein the electric unmanned flying object is a drone.

10. The floating advertisement device according to claim 6, wherein
    a receiver capable of receiving, by radio, video signals or a broadcast from the outside is provided inside the advertisement medium, and the receiver is connected to the advertisement display unit.

11. A floating advertisement device, comprising:
    an electric unmanned flying object connected to one end of a power supply line that supplies power;
    a control unit controlling an operation of the electric unmanned flying object;
    an advertisement medium hung from the electric unmanned flying object, and having, at a lower end surface thereof, a landing guide part that performs positioning at a time of descending, the advertisement medium further having a lower surface side that is narrowed;
    an advertisement display unit being a thin and bendable organic EL display capable of displaying advertisement contents in a changeable manner as an outer peripheral surface of the advertisement medium, and to which power is supplied by being connected to the power supply line;
    a power source disposed on the ground and connected to the other end of the power supply line; and
    a support member capable of supporting the advertisement medium by being fitted with the landing guide part when the advertisement medium descends.

12. The floating advertisement device according to claim 11, wherein
the landing guide part of the advertisement medium is formed in a tapered recessed shape in which an upper side is narrowed, and the support member is formed in a tapered projecting shape in which an upper side is narrowed.

13. The floating advertisement device according to claim 11, wherein
the landing guide part of the advertisement medium is formed in a tapered projecting shape in which a lower side is narrowed, and the support member is formed in a tapered recessed shape in which a lower side is narrowed.

14. The floating advertisement device according to claim 11, wherein the electric unmanned flying object is a drone.

15. The floating advertisement device according to claim 11, wherein
a receiver capable of receiving, by radio, video signals or a broadcast from the outside is provided inside the advertisement medium, and the receiver is connected to the advertisement display unit.

* * * * *